United States Patent Office 3,689,273
Patented Sept. 5, 1972

3,689,273
SILVER HALIDE EMULSION CONTAINING SULFUR OR SELENIUM SENSITIZER AND HYDROXY TETRA-AZAINDENE STABILIZER
Jozef Frans Willems, Wilrijk, Jules Robert Berendsen, Deurne, Robert Joseph Pollet, Vremde, and Antoon Leon Vandenberghe, Hove, Belgium, assignors to Gevaert-Agfa N.V., Mortsel, Belgium
No Drawing. Filed Oct. 27, 1970, Ser. No. 84,491
Claims priority, application Great Britain, Nov. 18, 1969, 56,426/69
Int. Cl. G03c 1/34, 1/28
U.S. Cl. 96—109
7 Claims

ABSTRACT OF THE DISCLOSURE

A photographic silver halide emulsion wherein the silver halide has been chemically ripened in an aqueous hydrophilic colloid medium comprising as a chemical sensitizer an aliphatic or aromatic sulphide or selenide comprising at least three sulphur and/or selenium atoms linked together and as a stabilizer against fog formation a hydroxy tetra-azaindene compound, and the method of preparing the emulsion is described. The emulsion has superior sensitivity and reduced fog particularly upon storage.

---

The present invention relates to the chemical sensitization of silver halide emulsions.

In accordance with the present invention novel labile sulphur or selenium containing compounds are provided which are very effective for use in the chemical sensitization of silver halide emulsions.

The compounds of use according to the present invention are aliphatic or aromatic sulphides and selenides comprising at least three sulphur and/or selenium atoms linked to each other, which in the presence of silver halides form sensitivity increasing silver sulphide or silver selenide nuclei and at the same time form aliphatic or aromatic thiols or selenols or derivatives thereof which locally inhibit the formation of fog.

Particularly suitable compounds for use in accordance with the present invention as chemical sensitizers are those represented by the following formula:

$$R_1—X—(Y)_n—X—R_2$$

wherein:

each of $R_1$ and $R_2$, the same or different, stands for alkyl including substituted alkyl or aryl including substituted aryl,
each of X and Y, the same or different, stands for sulphur or selenium, and
$n$ stands for 1 to 4.

The following is a non-limitative list of compounds suitable for use in accordance with the present invention and includes literature references as to the preparation of the compounds involved.

| | | |
|---|---|---|
| 1 | $H_3C—(CH_2)_3—S—S—S—(CH_2)_3—CH_3$ | Ann. 359, 81 (1908). |
| 2 | $HOOC—CH_2—S—S—S—CH_2—COOH$ | Ann. 359, 81 (1908). |
| 3 |  | J. Org. Chem. 32, 454 (1967). |
| 4 | $H_3C—S—S—S—CH_3$ | J. Am. Chem. Soc. 73, 3,627 (1951); J. Chem. Soc. 97, 1,195 (1910). |
| 5 | ⟨⟩—$CH_2—S—S—S—CH_2$—⟨⟩ | |
| 6 | ⟨⟩—$S—S—S$—⟨⟩ | Ber. 58, 417 (1925). |
| 7 | $F_3C—CF_2—CF_2—S—S—S—CF_2—CF_2—CF_3$ | J. Am. Chem. Soc. 73, 5,461 (1951). |
| 8 | ⟨⟩—$S—S—S$—⟨⟩ with $NO_2$, $O_2N$ | Ber. 55, 2,423 (1922). |
| 9 | ⟨⟩—$Se—Se—Se$—⟨⟩ with $NO_2$, $O_2N$ | Ber. 88, 1 (1955) Houben-Weyl, 9, 1111. |
| 10 | ⟨⟩—$Se—S—Se$—⟨⟩ with $NO_2$, $O_2N$ | Houben-Weyl, 9, 1,113. |
| 11 | $S—S—CH_2—CO—O—C_8H_{17}$-iso<br>$\mid$<br>$S—S—CH_2—CO—O—C_8H_{17}$-iso | |

It is known to increase the light-sensitivity of silver halide emulsions by effecting the ripening of the silver halide emulsions in the presence of so-called sulphur sensitizers comprising a labile sulphur atom such as sodium thiosulphate and allyl thiourea which are assumed to form centres of sensitivity, by the formation of silver sulphide, in or on the silver halide grains.

Compound 11 is a commercially available tetrasulphide marketed by Evans Chemetics Inc., New York, USA under the name tetrathio bis(isooctyl acetate).

For further details concerning compounds of use according to the present invention there can be referred to Houben-Weyl, 9 pages 88–90 and pages 1109–1114.

The optimum amount of chemical sensitizer to be used according to the present invention depends amongst others on the chosen compounds, on the nature of the colloidal binding agent for the silver halide grains, on the amount, the kind and the grain size of the silver halide as well as on the chosen ripening temperature. This amount can be determined by some simple tests as known to those skilled in the art. They are generally used in amounts varying from 0.001 to 0.25 millimole, preferably from 0.01 to 0.1 millimole per mole of silver halide. It is evident that the amounts of the new sensitizers used can be varied according to the sensitization effects desired.

The new sulphur-sensitizers according to the present invention may be used in combination with reduction sensitizers such as tin compounds, sodium sulphite, iminoamino methane sulphinic acids and derivatives thereof and cadmium salts. Precious metal salts such as compounds of gold, platinum, palladium, iridium, ruthenium and rhodium can also be added to the emulsions whereby an additional increase of sensitivity can be obtained.

The compounds of use according to the present invention can be used for chemically sensitizing spectrally as well as nonspectrally sensitized emulsions, emulsions for use in diffusion transfer processes for the production of silver images, X-ray emulsions, photo-developable print-out emulsions, emulsions for rapid stabilization processing, etc. They may be used for high speed negative emulsions as well as for rather low speed positive materials.

The emulsions chemically sensitized in accordance with the present invention may contain any of the ingredients commonly employed in silver halide emulsions such as stabilizers, fog-inhibiting agents, colour couplers, developing agents, hardening agents, softening agents, surface-active compounds, development accelerators such as polyoxyalkylene compounds and onium compounds.

The compounds of use according to the present invention are most suitable for the chemical sensitization of silver halide emulsions to which subsequently azaindene antifoggants or stabilizers are added particularly the widely known hydroxy tetra azaindene stabilizers such as 5-methyl-7-hydroxy-s-triazolo[1,5-a] pyrimidine.

Various silver salts may be used as light-sensitive salt such as silver bromide, silver iodide, silver chloride or mixed silver halides such as silver chlorobromide, silver bromoiodide and silver chlorobromoiodide.

The hydrophilic colloid used as the vehicle for the silver halide may be any of the common hydrophilic colloids employed in photographic light-sensitive emulsions for example gelatin, albumin, casein, zein, alginic acid, collodion, a cellulose derivative such as carboxymethyl cellulose, a synthetic hydrophilic colloid such as polyvinyl alcohol and poly-N-vinylpyrrolidon, etc. gelatin being preferred however. If desirable, compatible mixtures of two or more colloids may be employed for dispersing the silver halide.

The following examples illustrate the present invention.

EXAMPLE 1

An ammoniacal silver bromoiodide emulsion (4.7 mole percent of iodide) having per kg. a silver halide content corresponding to 50 g. of silver nitrate was prepared using inert gelatin as binding agent. The emulsion was divided into several portions and each portion was ripened with one of the compounds listed in the table below.

To the emulsions ready for coating were added per kg.: 150 mg. of 5-methyl-7-hydroxy-s-triazolo[1,5-a] pyrimidine as stabilizer and 100 mg. of polyethylene glycol having an average molecular weight of 6000 as development accelerator as well as saponin as coating aid.

The emulsions were coated on subbed cellulose triacetate supports and then overcoated with a gelatin antistress layer comprising formaldehyde as hardening agent.

After development for 5 min. at 20° C. in a bath of the following composition:
water—800 ml.
p-monomethylaminophenol sulphate—1.5 g.
sodium sulphite (anhydrous)—50 g.
hydroquinone—6 g.
sodium carbonate (anhydrous)—32 g.
potassium bromide—2 g.
water to make 1000 ml.

the following sensitometric results were attained.

The values of the speed are relative values determined at a density 0.1 above fog; the value 100 is given to the fresh material ripened with sodium thiosulphate.

| Amount of sulphur sensitizer per kg. of emulsion | Fresh material | | | Material stored for 3 days at 57° C. and 34% RH | | |
|---|---|---|---|---|---|---|
| | Fog | Gradation | Speed | Fog | Gradation | Speed |
| 0.5 mg. of sodium thiosulphate | 0.24 | 0.66 | 100 | 1.03 | 0.44 | 30 |
| 1.0 mg. of— | | | | | | |
| Compound 1 | 0.14 | 0.73 | 132 | 0.42 | 0.55 | 126 |
| Compound 2 | 0.14 | 0.64 | 121 | 0.43 | 0.59 | 115 |

From the results attained it appears that as compared with sodium thiosulphate the chemical sensitizers of the present invention have a better sensitizing effect. They also give less fog-formation and speed-decrease upon storing.

EXAMPLE 2

Example 1 was repeated taking care that the fresh emulsions had approximately the same fog value.

The following sensitometric results were attained.

| Amount of sulphur sensitizer per kg. of emulsion | Fresh material | | | Material stored for 3 days at 57°C. and 34% RH | | |
|---|---|---|---|---|---|---|
| | Fog | Gradation | Speed | Fog | Gradation | Speed |
| 0.5 mg. of sodium thiosulphate | 0.14 | 1.06 | 100 | 0.44 | 0.87 | 104 |
| 1.0 mg. of— | | | | | | |
| Compound 1 | 0.15 | 1.04 | 104 | 0.20 | 0.98 | 104 |
| Compound 2 | 0.14 | 1.08 | 110 | 0.21 | 0.91 | 100 |
| Compound 11 | 0.13 | 0.97 | 100 | 0.18 | 0.87 | 87 |

From these results it appears that the compounds of use according to the present invention give better fog-values upon storing than when using sodium thiosulphate.

EXAMPLE 3

Silver bromoiodide emulsions as described in Example 1 were ripened on the one hand by means of 0.5 mg. of sodium thiosulphate per kg. and on the other hand by means of 1 mg. of compound 2 per kg.

To the emulsions ripened with sodium thiosulphate were then added, after ripening, in addition to the 5-methyl - 7 - hydroxy-s-triazole[1,5-a]pyrimidine and the polyethylene glycol as described in Example 1, 1-phenyl-2-tetrazoline - 5 - thione in the amounts listed in the table below as supplemental stabilizer whereas to the emulsions ripened with compound 2 or 1 - phenyl-2-tetrazoline-5-thione was added.

After development as described in Example 1, the following sensitometric results were attained.

| Chemical sensitizer per kg. emulsion | 1-phenyl-2-tetrazoline-5-thione per kg. emulsion | Fresh material | | | Material stored for 3 days at 57°C. and 34% RH | | |
|---|---|---|---|---|---|---|---|
| | | Fog | Gradation | Speed | Fog | Gradation | Speed |
| 0.5 mg. of sodium thiosulphate [1] | | 0.09 | 1.28 | 100 | 0.78 | 0.93 | 57 |
| Do.[1] | 5 mg. (0.095 millimole/mole silver halide) | 0.06 | 1.38 | 88 | 0.31 | 1.01 | 88 |
| Do.[1] | 10 mg. (0.19 millimole/mole silver halide) | 0.05 | 1.36 | 76 | 0.10 | 1.15 | 79 |
| 1 mg. of compound 2 [2] | | 0.06 | 1.51 | 76 | 0.08 | 1.32 | 88 |

[1] 0.0108 millimole/mole silver halide.
[2] 0.016 millimole/mole of silver halide.

These results illustrate that the local formation of mercaptide has a superior stabilizing effect in comparison to the common procedure where mercapto compounds are added as stabilizers after the chemical sensitization of the silver halide emulsions.

When 1 mg. of compound 2 reacts completely, at most 0.032 millimole of mercaptide is formed per mole of silver halide which is markedly less than the amounts of 1 - phenyl - 2 - tetrazoline - 5 - thione added and nevertheless fog-formation upon storage is lower.

We claim:

1. A photographic silver halide emulsion wherein the silver halide has been chemically ripened in an aqueous hydrophilic colloid medium comprising as a chemical sensitizer an aliphatic or aromatic sulphide or selenide comprising at least three sulphur and/or selenium atoms linked to each other having the formula:

$$R_1-X-(Y)_n-X-R_2$$

wherein: each of $R_1$ and $R_2$, the same or different stands for an alkyl group or an aryl group; each of X and Y, the same or different stands for sulfur or selenium; and $n$ stands for 1 to 4. and as a stabilizer against fog formation a hydroxy tetraazaindene compound.

2. A photographic silver halide emulsion according to claim 1 wherein the chemical sensitizer is $$H_3C-(CH_2)_3-S-S-S-(CH_2)_3-CH_3$$

3. A photographic silver halide emulsion according to claim 1 wherein the chemical sensitizer is $$HOOC-CH_2-S-S-S-CH_2-COOH$$

4. A photographic silver halide emulsion according to to claim 1 wherein the chemical sensitizer is $$\begin{array}{l} S-S-CH_2-CO-O-C_8H_{17}\text{-iso} \\ | \\ S-S-CH_2-CO-O-C_8H_{17}\text{-iso} \end{array}$$

5. A photographic silver halide emulsion according to claim 1, wherein the hydrophilic colloid is gelatin.

6. A photographic silver halide emulsion according to claim 1, wherein the said chemical sensitizer is used in an amount comprised between 0.001 and 0.25 millimole per mole of silver halide.

7. A photographic silver halide emulsion according to claim 1, wherein the said stabilizer is 5-methyl-7-hydroxy-s-triazolo[1,5-a] pyrimidine.

References Cited

UNITED STATES PATENTS

| 1,673,522 | 6/1928 | Matthies, et al. | 96—107 |
| 1,623,499 | 4/1927 | Sheppard et al. | 96—107 |
| 2,835,581 | 5/1958 | Tinker et al. | 96—109 |
| 3,320,069 | 5/1967 | Illingsworth | 96—107 |
| 3,508,921 | 4/1970 | Van Pee et al. | 96—107 X |

NORMAN G. TORCHIN, Primary Examiner

W. H. LOWIE, JR., Assistant Examiner

U.S. Cl. X.R.

96—107